(No Model.)

E. GRIFFIN.
FISHING REEL ATTACHMENT.

No. 357,988. Patented Feb. 15, 1887.

Witnesses:
Richard P. Dunay
Arthur M. Buyden

Ellwood Griffin
Inventor.
By his atty Alex. Selkirk

UNITED STATES PATENT OFFICE.

ELLWOOD GRIFFIN, OF NEW YORK, N. Y.

FISHING-REEL ATTACHMENT.

SPECIFICATION forming part of Letters Patent No. 357,988, dated February 15, 1887.

Application filed October 29, 1886. Serial No. 217,494. (No model.)

*To all whom it may concern:*

Be it known that I, ELLWOOD GRIFFIN, a citizen of the United States, and a resident of the city, county, and State of New York, have invented certain new and useful Improvements in Devices for Attaching Reels to Fishing-Rods, of which the following is a specification.

My invention relates to improvements in devices for attaching reels to fishing-rods, in which a dovetail socket, made with the base-piece of the reel, and a dovetail tenon, attached to the rod, operate in conjunction with an elastic stop, also attached to the rod.

The objects of my invention are to provide, with a fishing rod and reel, a dovetail tenon and socket which will not receive and retain water, and which will be held together by means of an elastic detent, so as to form a reliable connection between the reel and the rod and afford a convenient means for detaching at will the former from the latter. I attain these objects by means of the mechanism illustrated in the accompanying drawings, forming a part of this specification, in which drawings there are five figures illustrating my invention in all of which the same designation of parts by reference-letters is used.

Figure 1:
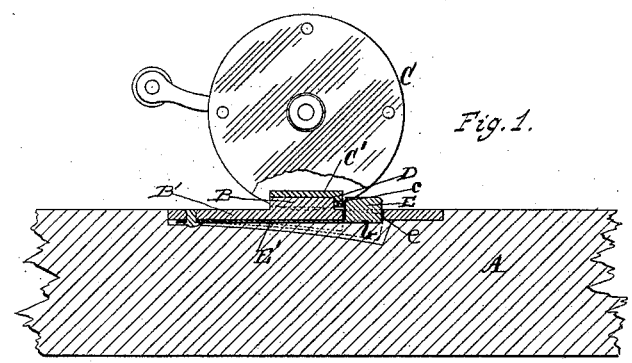
Figure 2:
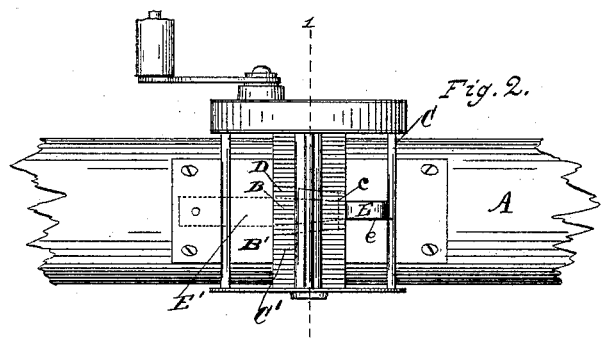
Figure 3:
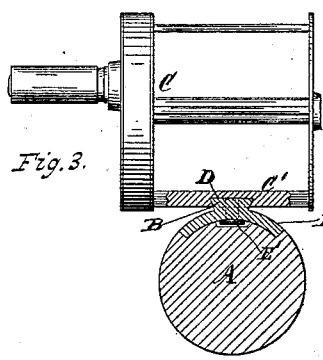
Figure 4:
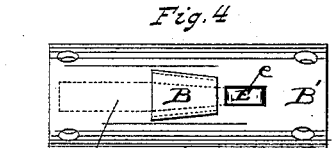
Figure 5:
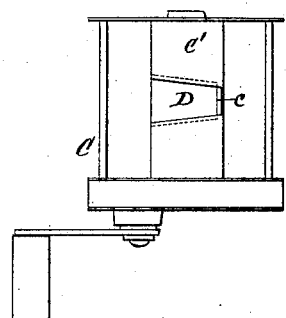

Referring to the drawings, Figure 1 is a sectional view of reel, rod, and attaching device. Fig. 2 is a plan view. Fig. 3 is a sectional view at line 1, Fig. 2. Fig. 4 is a plan view of attaching-plate of rod, showing dovetail tenon; and Fig. 5 is a view from beneath of base-piece of reel, showing dovetail socket.

The rod A has securely fixed to it the dovetail tenon B, made with or fixed to attaching-plate B'. The sides of this dovetail tenon project above the upper surface of attaching-piece B' to a distance of near one-eighth of an inch, and are made to incline inwardly as they run downwardly, so as to form holding beveled sides, as shown in Fig. 3. Attaching-plate B' is preferably made with a curvature corresponding with that of the rod in its cross-direction, and is set into a recess made in the wood of the rod, so that its upper surface will be flush with the surface of the wood of the rod, and it is secured in place by suitable screws or rivets, or other suitable known means.

C is the reel, made with any known form of construction and having the base-piece C'. D is a dovetail socket, which is shown in the drawings to be made in base-piece C', although it can be made to consist of a piece which is attached to said base-piece. This dovetail socket is made with size and form and angle of incline of sides which correspond with those of the dovetail tenon B, so that the latter will nicely enter into and engage with the former. The rear end of this dovetail socket is made with stop-wall c, which closes the rear end of the socket and has bearing against the rear end of tenon B, to hold the base-plate of the reel from moving outward.

E is a detent or stop-catch, which is attached to spring E', secured to the lower side of attaching-plate B' and working in a suitable recess, b, made in the wood of the rod. This detent works through a corresponding perforation, e, made in plate B', and extends upward above the plane of the upper surface of said plate to a distance about on a plane with the upper surface of the dovetail tenon B. This detent is set off from the rear end of tenon B to a distance about equal to the thickness of the rear end wall, c, of dovetail socket D.

It will be observed that both the dovetail tenon and socket are made to flare outwardly and forwardly, as shown in Figs. 2, 4, and 5, so that one will wedge with the other. It is also seen that the front end portion of detent E is made to be a little inclined, so as to wedge with the outer side surface of the end stop-wall, c, of socket D.

When the reel is to be applied to the rod, the operator will place the socket C in base-plate C' partly over the rearward portion of tenon B, with the lower side of the end stop-wall, c, bearing on detent E, when he will press down on the reel with sufficient force as to force the detent down, and will at the same time shove the base-piece of the reel forward to the limit of the movement of socket D on tenon B, when detent E will be passed and will rise in place above the plane of the attaching-plate B' and have bearing against the rear side wall of the rear wall of socket C, as shown in Fig. 1, when the reel will be securely attached to the rod. By depressing the detent at the same time the reel is shoved back the socket D will be carried out from engagement with its coacting tenon B'.

By my improvement I obviate the use of rings, which usually become more or less tightened by the swelling of the wood of the rod.

I am aware that a sliding plate attached to a reel and a stationary plate provided with side holding-lips turned over the edge of the sliding reel-plate and having a yielding stop are old. Such devices for attaching reels with rods form no part of my invention.

Having described my invention, what I claim, and desire to secure by Letters Patent, is—

The combination, with the attaching-plate B', provided with the upwardly-projecting and tapering dovetail tenon B, and the base-plate C' of a reel having in its lower side the tapering dovetail socket D, of the elastic detent or stop-catch E, substantially as and for the purpose set forth.

ELLWOOD GRIFFIN.

Witnesses:
RICHARD P. DUMARY,
ARTHUR M. BUGDEN.